United States Patent
Wang et al.

(10) Patent No.: US 12,182,324 B2
(45) Date of Patent: Dec. 31, 2024

(54) METHOD AND APPARATUS FOR DETECTING DELAY AMOUNT OF EYEBALL TRACKING APPARATUS, EYEBALL TRACKING SYSTEM, AND NON-TRANSITORY COMPUTER-READABLE STORAGE MEDIUM

(71) Applicants: Beijing BOE Optoelectronics Technology Co., Ltd., Beijing (CN); BOE TECHNOLOGY GROUP CO., LTD., Beijing (CN)

(72) Inventors: Longhui Wang, Beijing (CN); Wenyu Li, Beijing (CN); Jinghua Miao, Beijing (CN); Xi Li, Beijing (CN); Xuefeng Wang, Beijing (CN); Zihe Liu, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 322 days.

(21) Appl. No.: 17/765,708

(22) PCT Filed: May 26, 2021

(86) PCT No.: PCT/CN2021/095978
§ 371 (c)(1),
(2) Date: Mar. 31, 2022

(87) PCT Pub. No.: WO2021/238966
PCT Pub. Date: Dec. 2, 2021

(65) Prior Publication Data
US 2022/0350403 A1    Nov. 3, 2022

(30) Foreign Application Priority Data
May 29, 2020  (CN) .......................... 202010482068.3

(51) Int. Cl.
*G06F 3/01* (2006.01)
*G06T 7/194* (2017.01)
(Continued)

(52) U.S. Cl.
CPC .............. *G06F 3/013* (2013.01); *G06T 7/194* (2017.01); *G06T 7/20* (2013.01); *G06T 11/00* (2013.01);
(Continued)

(58) Field of Classification Search
CPC . G06F 3/013; G06T 7/194; G06T 7/20; G06T 11/00; G06T 2207/10048; G06T 2210/36
See application file for complete search history.

(56) References Cited

U.S. PATENT DOCUMENTS

| 10,463,249 B1 | 11/2019 | Stone et al. |
| 2016/0202757 A1* | 7/2016 | Miao ................... H04N 23/611 348/78 |

(Continued)

FOREIGN PATENT DOCUMENTS

| CN | 104331902 A | 2/2015 |
| CN | 105824239 A | 8/2016 |

(Continued)

OTHER PUBLICATIONS

English translation of Applicant Admitted Prior Art pp. 39-54 (Year: 2020).*

(Continued)

*Primary Examiner* — Lixi C Simpson
(74) *Attorney, Agent, or Firm* — HOUTTEMAN LAW LLC (57) ABSTRACT

Provided are a method and an apparatus for detecting a delay amount of an eyeball tracking apparatus, an eyeball tracking system, and a non-transitory computer-readable storage medium. The method includes: receiving a detected gaze (Continued)

point coordinate of a mechanical eye at the at least one detection time point; determining an actual gaze point coordinate of the mechanical eye at the at least one detection time point; and determining the delay amount of the eyeball tracking apparatus according to a coordinate difference between the actual gaze point coordinate and the detected gaze point coordinate at the at least one detection time point.

18 Claims, 5 Drawing Sheets

(51) Int. Cl.
  *G06T 7/20* (2017.01)
  *G06T 11/00* (2006.01)
(52) U.S. Cl.
  CPC   *G06T 2207/10048* (2013.01); *G06T 2210/36* (2013.01)

(56) References Cited

U.S. PATENT DOCUMENTS

| | | | |
|---|---|---|---|
| 2019/0258857 A1 | 8/2019 | Alonso | |
| 2020/0391383 A1* | 12/2020 | Burgess | B25J 9/1664 |
| 2021/0041945 A1* | 2/2021 | Cooper | G06T 7/11 |

FOREIGN PATENT DOCUMENTS

| | | |
|---|---|---|
| CN | 106596051 A | 4/2017 |
| CN | 107317987 A | 11/2017 |
| CN | 107430785 A | 12/2017 |
| CN | 107589837 A | 1/2018 |
| CN | 107833251 A | 3/2018 |
| CN | 108665521 A | 10/2018 |
| CN | 108733204 A | 11/2018 |
| CN | 108958473 A | 12/2018 |
| CN | 109062415 A | 12/2018 |
| CN | 109104603 A | 12/2018 |
| CN | 110442011 A | 11/2019 |
| CN | 210038329 U | 2/2020 |
| CN | 111190482 A | 5/2020 |
| CN | 111639017 A | 9/2020 |
| JP | 2017176302 A | 10/2017 |
| WO | 2019218783 A1 | 11/2019 |

OTHER PUBLICATIONS

Yue Tan, "The research and implementation of real-time eye tracking system," Master's Thesis, Feb. 15, 2020, Kidian University, www.xidian.edu.cn, Xi'an, Shaanxi, China.
China Patent Office, First Office Action issued Apr. 27, 2023 for application No. CN202010482068.3.

* cited by examiner

METHOD AND APPARATUS FOR DETECTING DELAY AMOUNT OF EYEBALL TRACKING APPARATUS, EYEBALL TRACKING SYSTEM, AND NON-TRANSITORY COMPUTER-READABLE STORAGE MEDIUM

CROSS-REFERENCE TO RELATED APPLICATIONS

The present application claims the priority of the Chinese Patent Application No. 202010482068.3, filed on May 29, 2020, the content of which is incorporated herein by reference in its entirety.

TECHNICAL FIELD

The present disclosure relates to the field of display technology, and in particular, to a method and an apparatus for detecting a delay amount of an eyeball tracking apparatus, an eyeball tracking system, and a non-transitory computer-readable storage medium.

BACKGROUND

In a virtual display apparatus, high requirements for high resolution and refresh rate result in great rendering burden on a video card. In order to reduce the rendering burden and enhance rendering efficiency, in the related art, a high resolution image is rendered for a gaze area of a human eye based on an eyeball tracking technology, and a low resolution image is rendered in other areas except the gaze area.

SUMMARY

According to an aspect of the present disclosure, a method for detecting a delay amount of an eyeball tracking apparatus is provided to include: receiving a detected gaze point coordinate of a mechanical eye at at least one detection time point, the detected gaze point coordinate being a gaze point coordinate of the mechanical eye obtained by the eyeball tracking apparatus; determining an actual gaze point coordinate of the mechanical eye at the at least one detection time point; and determining the delay amount of the eyeball tracking apparatus according to a coordinate difference between the actual gaze point coordinate and the detected gaze point coordinate at the at least one detection time point.

In some embodiments, the method further includes presetting a mapping relationship between gaze point coordinates of the mechanical eye and time; controlling rotation of the mechanical eye according to the mapping relationship between gaze point coordinates and time; and obtaining the detected gaze point coordinate of the mechanical eye at the at least one detection time point during the rotation of the mechanical eye.

In some embodiments, the actual gaze point coordinate of the mechanical eye at the at least one detection time point is determined according to the mapping relationship between gaze point coordinates and time.

In some embodiments, the determining the delay amount of the eyeball tracking apparatus according to the coordinate difference between the actual gaze point coordinate and the detected gaze point coordinate at the at least one detection time point includes: calculating the coordinate difference between the actual gaze point coordinate and the detected gaze point coordinate at the at least one detection time point; and determining the delay amount of the eyeball tracking apparatus according to the coordinate difference and a rotation angular speed of the mechanical eye.

In some embodiments, the at least one detection time point includes a plurality of detection time points, and the determining the delay amount of the eyeball tracking apparatus according to the coordinate difference and the rotation angular speed of the mechanical eye includes: determining a delay amount corresponding to each of the plurality of detection time points according to the coordinate difference and the rotation angular speed of the mechanical eye; and determining the delay amount of the eyeball tracking apparatus according to a plurality of delay amounts corresponding to the plurality of detection time points.

In some embodiments, the method further includes calculating an average value of the plurality of delay amounts corresponding to the plurality of detection time points, the average value being taken as the delay amount of the eyeball tracking apparatus.

In some embodiments, the delay amount of the eyeball tracking apparatus is calculated by:

$$d = \frac{1}{n}\sum_{i=1}^{n}(|p_i - \overline{p_i}| * f(v))$$

wherein n is the number of the plurality of detection time points, $p_i$ is the detected gaze point coordinate of an $i^{th}$ detection time point, $\overline{p}i$ is the actual gaze point coordinate of the $i^{th}$ detection time point, $|p_i-\overline{p}i|$ is the coordinate difference between the detected gaze point coordinate and the actual gaze point coordinate at the $i^{th}$ detection time point, v is the rotation angular speed of the mechanical eye, and f (v) is a function between a movement speed of the gaze point of the mechanical eye and v.

In some embodiments, the obtaining the detected gaze point coordinate of the mechanical eye includes: emitting, by the eyeball tracking apparatus, infrared light to the mechanical eye; acquiring, by the eyeball tracking apparatus, an infrared image of the mechanical eye; and determining, by the eyeball tracking apparatus, the detected gaze point coordinate of the mechanical eye according to the infrared image of the mechanical eye.

According to an aspect of the present disclosure, an apparatus for detecting a delay amount of an eyeball tracking apparatus is provided to include a detected coordinate reception module configured to receive a detected gaze point coordinate of a mechanical eye at at least one detection time point, the detected gaze point coordinate being a gaze point coordinate of the mechanical eye obtained by the eyeball tracking apparatus; an actual coordinate obtaining module configured to determine an actual gaze point coordinate of the mechanical eye at the at least one detection time point; and a delay amount determination module configured to determine the delay amount of the eyeball tracking apparatus according to a coordinate difference of the actual gaze point coordinate and the detected gaze point coordinate at the at least one detection time point.

In some embodiments, the apparatus further includes a control module configured to preset a mapping relationship between gaze point coordinates of the mechanical eye and time; and to control rotation of the mechanical eye according to the mapping relationship between gaze point coordinates of the mechanical eye and time, so that the detected coordinate reception module receives the detected gaze point coordinate of the mechanical eye at the at least one detection time point during the rotation of the mechanical eye.

In some embodiments, the actual coordinate obtaining module is configured to determine the actual gaze point coordinate of the mechanical eye at the at least one detection time point according to the mapping relationship between gaze point coordinates of the mechanical eye and time.

In some embodiments, the delay amount determination module includes a first determination submodule configured to calculate the coordinate difference between the actual gaze point coordinate and the detected gaze point coordinate at the at least one detection time point; and a second determination submodule configured to determine the delay amount of the eyeball tracking apparatus according to the coordinate difference and a rotation angular speed of the mechanical eye.

In some embodiments, the at least one detection time point includes a plurality of detection time points, and the second determination submodule is further configured to: determine a delay amount corresponding to each of the plurality of detection time points according to the coordinate difference and the rotation angular speed of the mechanical eye; and determine the delay amount of the eyeball tracking apparatus according to a plurality of delay amounts corresponding to the plurality of detection time points.

In some embodiments, the second determination submodule is further configured to calculate an average value of the plurality of delay amounts corresponding to the plurality of detection time points, and to take the average value as the delay amount of the eyeball tracking apparatus.

According to an aspect of the present disclosure, an eyeball tracking system is provided to include an eyeball tracking apparatus and the apparatus for detecting the delay amount of the eye tracking apparatus as above.

In some embodiments, the eyeball tracking apparatus is a head-mounted display device worn on a head model with the mechanical eye.

In some embodiments, the eyeball tracking apparatus includes an emission module configured to emit infrared light to the mechanical eye; an acquisition module configured to acquire an infrared image of the mechanical eye; and a coordinate determination module configured to determine the detected gaze point coordinate of the mechanical eye according to the infrared image of the mechanical eye.

In some embodiments, the eyeball tracking apparatus further includes a visual field determination module configured to determine a visual field area of the mechanical eye, with a center at the detected gaze point coordinate, according to the obtained detected gaze point coordinate of the mechanical eye; an image processing module configured to perform image processing on a portion of an image to be displayed corresponding to the visual field area to obtain a processed image of the visual field area, and to splice a portion of the image to be displayed corresponding to other areas except the visual field area and the processed image of the visual field area, to obtain an image to be output; an output module configured to output the image to be output; and a display module configured to receive the image to be output by the output module and to display the image to be output.

According to an aspect of the present disclosure, an apparatus for detecting a delay amount of an eyeball tracking apparatus is provided to include a processor and a memory having program instructions stored thereon, wherein the processor executes the program instructions to perform the method as above.

According to an aspect of the present disclosure, a non-transitory computer-readable storage medium is provided to have program instructions stored thereon, wherein when executed on a computer, the program instructions causes the computer to perform the method as above

BRIEF DESCRIPTION OF DRAWINGS

The accompanying drawings are intended to provide a further understanding of the present disclosure, and constitute a part of the specification to explain the present disclosure together with the following exemplary embodiments, but not intended to limit the present disclosure.

DETAIL DESCRIPTION OF EMBODIMENTS

The specific implementations of the present disclosure will be described in detail below with reference to the accompanying drawings. It should be understood that the specific implementations described herein are only intended to illustrate and explain the present disclosure, but not to limit the present disclosure.

In order to reduce rendering burden and enhance rendering efficiency, a high resolution image is rendered for a gaze area of a human eye based on an eyeball tracking technology, and a low resolution image is rendered for other areas except the gaze area. However, when the above eyeball tracking technology is used for eyeball tracking, delay occurs, thereby influencing experience of a user. In order to optimize the solution of the eyeball tracking, a delay amount of the eyeball tracking needs to be measured.

Figure 1:
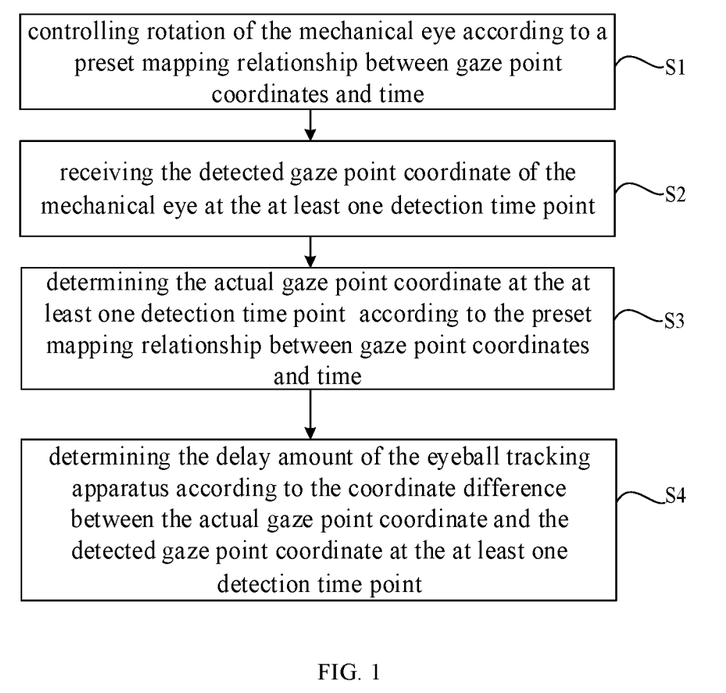
FIG. 1 is a flowchart of a method for detecting a delay amount of an eyeball tracking apparatus in some embodiments of the present disclosure.

Accordingly, a method for detecting a delay amount of an eyeball tracking apparatus is provided in the present disclosure, and FIG. 1 is a flowchart of a method for detecting a delay amount of an eyeball tracking apparatus in some embodiments of the present disclosure. As shown in FIG. 1, the method for detecting a delay amount of an eyeball tracking apparatus includes the following steps S1 to S4.

In step S1, rotation of a mechanical eye is controlled according to a preset mapping relationship between gaze point coordinates and time, so that the mapping relationship between actual (or real) gaze point coordinates of the mechanical eye and time fulfills the preset mapping relationship between gaze point coordinates and time. The mechanical eye is a mechanical structure imitating a human eye, and is controlled by a high precision actuator so as to imitate the rotation of the human eye. The preset mapping relationship between gaze point coordinates of the mechanical eye and time is determined by experiments. However, it should be understood that, the mechanical eye may not be set to rotate according to the preset mapping relationship between gaze point coordinates and time, and the present disclosure is not limited thereto.

In step S2, a detected gaze point coordinate of the mechanical eye at at least one detection time point is received. The detected gaze point coordinate is a gaze point coordinate of the mechanical eye obtained by the eyeball tracking apparatus.

For example, the eyeball tracking apparatus may include a display module (e.g., a display screen or the like) and a tracking device. The gaze point coordinates of the mechanical eye is determined by the tracking device. It should be noted that, the detected gaze point coordinate of the mechanical eye in the embodiments of the present disclosure refer to a coordinate of a gaze point of the mechanical eye on the display module of the eyeball tracking apparatus.

For example, the tracking device emits infrared light to a rotating mechanical eye, and determines the orientation of the mechanical eye according to an infrared image of the mechanical eye, thereby determining the detected gaze point coordinate of the mechanical eye on the display module.

The tracking device may perform one time of eyeball tracking once the display module displays one frame of image. One or more detection time points may be set. When more detection time points are provided, each of the detection time points obtained for each frame of image is a time point at which the tracking device performs the eyeball tracking each time, or each of the detection time points is a time point once every N (N>1) frames.

In step S3, the actual gaze point coordinate at the at least one detection time point is determined according to the preset mapping relationship between gaze point coordinates and time.

In step S4, the delay amount of the eyeball tracking apparatus is determined according to a coordinate difference between the actual gaze point coordinate and the detected gaze point coordinate at the at least one detection time point.

For example, the coordinate difference between the actual gaze point coordinate and the detected gaze point coordinate is a distance between an actual gaze point and a detected gaze point.

The present disclosure does not specifically limit the manner of determining the delay amount in the step S4. For example, the delay amount of the eyeball tracking apparatus may be determined according to preset correspondence relationship between distance and time. For another example, a theoretical time point corresponding to the actual gaze point is determined according to the preset mapping relationship between gaze point coordinates and time, and the delay amount of the eyeball tracking apparatus may be determined according to the difference between the theoretical time point and the detection time point.

Since the delay occurs when the eyeball tracking is performed by the eyeball tracking apparatus, when the rotation of the mechanical eye is controlled to make the actual gaze point coordinate of the mechanical eye at a certain detection time point (e.g., a time point t1) to be a coordinate (x1, y1), the gaze point coordinate of the mechanical eye at the time point t1 obtained by the eyeball tracking of the eyeball tracking apparatus may be different from the coordinate (x1, y1). Therefore, the duration in which the coordinate difference between the gaze point coordinate and the coordinate (x1, y1) occurs, i.e., the delay amount of the eyeball tracking apparatus, may be determined according to the coordinate difference, and the eyeball tracking apparatus may be optimized according to the delay amount.

Figure 2:
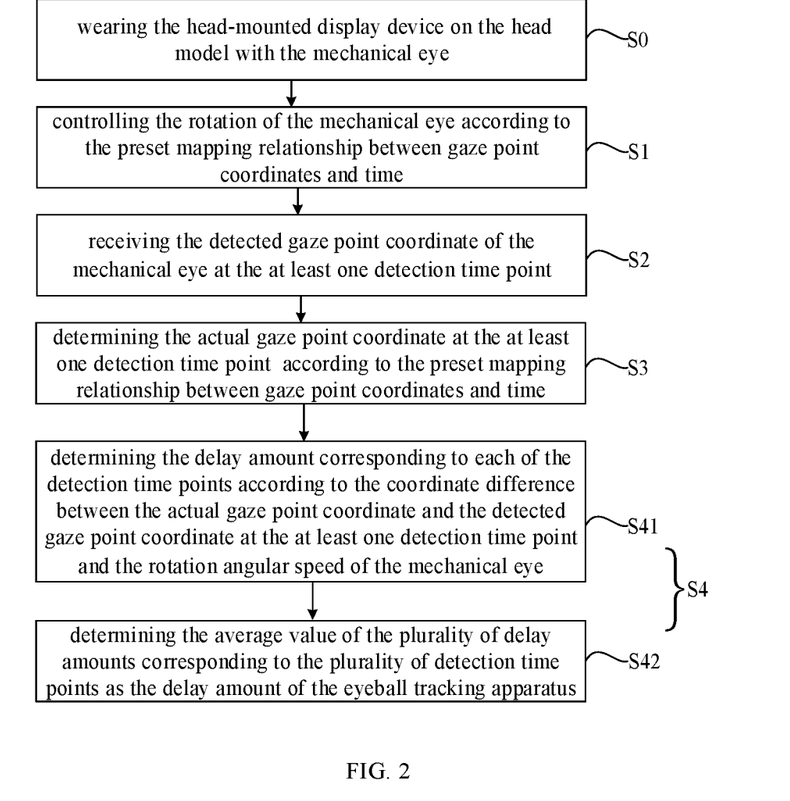
FIG. 2 is a flowchart of a method for detecting a delay amount of an eyeball tracking apparatus in some embodiments of the present disclosure.

FIG. 2 is a flowchart of a method for detecting a delay amount of an eyeball tracking apparatus in some embodiments of the present disclosure. The method for detecting the delay amount of the eyeball tracking apparatus will be described in detail with reference to FIG. 2. The eyeball tracking apparatus may include a head-mounted display device, such as a head-mounted VR (virtual reality) display device. The method includes the steps S0 to S4.

Figure 3:
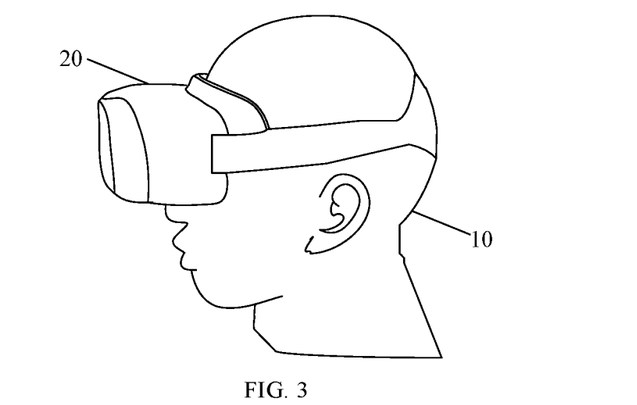
FIG. 3 is a schematic diagram illustrating a head model wearing a head-mounted display device in some embodiments of the present disclosure.

In step S0, a head-mounted display device 20 is worn on a head model 10 with a mechanical eye, as shown in FIG. 3.

In step S1, rotation of the mechanical eye is controlled according to the preset mapping relationship between gaze point coordinates and time.

In order to enhance measurement accuracy, in some embodiments, the preset mapping relationship between gaze point coordinates and time may be a simple function, for example, the preset mapping relationship between gaze point coordinates and time is a linear function, that is, both the abscissa and the ordinate of the gaze point coordinate increase as the time increases.

In step S2, a detected gaze point coordinate of the mechanical eye at the at least one detection time point is received. The detected gaze point coordinate is a gaze point coordinate of the mechanical eye obtained by the eye tracking apparatus. Alternatively, the at least one detection time point may include a plurality of detection time points.

Figure 4:
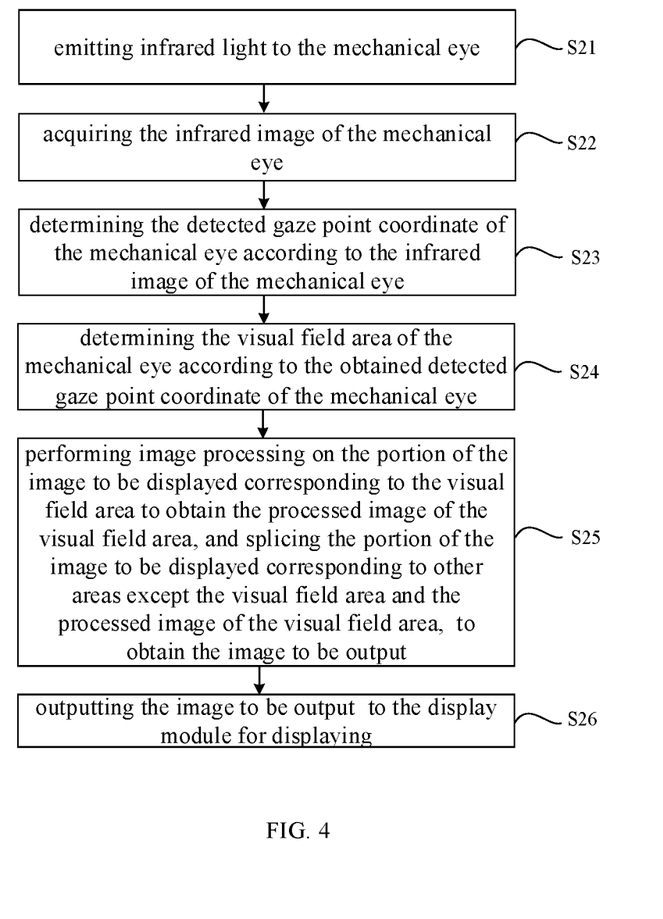
FIG. 4 is a flowchart of a method for outputting an image by an eyeball tracking apparatus in some embodiments of the present disclosure.

FIG. 4 is a flowchart of a method for outputting an image by an eyeball tracking apparatus in some embodiments of the present disclosure. As shown in FIG. 4, in some embodiments, obtaining the detected gaze point coordinate of the mechanical eye by the eyeball tracking apparatus includes the steps S21 to S26.

In step S21, infrared light is emitted to the mechanical eye. For example, the infrared light may be continuously emitted by the eyeball tracking apparatus to the mechanical eye.

In step S22, an infrared image of the mechanical eye is acquired.

In step S23, the detected gaze point coordinate of the mechanical eye is determined according to the infrared image of the mechanical eye. For example, the features of the pupil (or iris) of the mechanical eye are extracted from the infrared image of the mechanical eye, the orientation of the mechanical eye is determined from the extracted features, and the detected gaze point coordinate is determined from the orientation of the mechanical eye.

In step S24, a visual field area of the mechanical eye, which is a visual field area of the mechanical eye on the display module of the eyeball tracking apparatus, is determined according to the obtained detected gaze point coordinate of the mechanical eye.

Alternatively, an area with a size meeting preset requirement and a center located at the detected gaze point coordinate is used as the visual field area according to visual characteristics of a human eye. For example, a circular area with a center at the detected gaze point coordinate of the mechanical eye and a radius of a preset value around the center is used as the visual field area.

In step S25, image processing is performed on the portion of the image to be displayed corresponding to the visual field area to obtain the processed image of the visual field area, and the portion of the image to be displayed corresponding to other areas except the visual field area and the processed image of the visual field area are spliced to obtain the image to be output.

In some examples, the image processing performed on the portion of the image to be displayed corresponding to the visual field area is high resolution processing, and the resulting processed image of the visual field area is a high resolution image of the visual field area. Before the portion of the image to be displayed corresponding to the other areas is spliced with the high resolution image, anti-distortion processing may be performed on the portion of the image to be displayed corresponding to the other areas and on the high resolution image, and then the images after the anti-distortion processing are spliced, so that the image deformation which is possibly observed when a user watches the displayed image through an optical element is reduced.

In step S26, the image to be output is output to the display module of the eyeball tracking apparatus for displaying.

In the embodiments of the present disclosure, the eyeball tracking apparatus may obtain a visual field area according to the obtained detected gaze point coordinate of the mechanical eye, and perform high resolution processing on the portion located in the visual field area of the image to be displayed while performing no processing on the portion located in the other areas except the visual field area. The detected gaze point coordinate obtained in the step S2 are obtained by the eyeball tracking apparatus before the visual field area is determined.

In some embodiments, the eyeball tracking apparatus performs the operation of the steps S22 to S26 for each frame of image. The eyeball tracking apparatus outputs the detected gaze point coordinate of the mechanical eye and the current time point once it performs the step S23, thereby obtaining one three-dimensional vector. The three-dimensional vector includes the detected gaze point coordinate and the current time corresponding to the detected gaze point coordinate. The detection time points may be a number of current time points extracted from a plurality of current time points in a first frequency. The detected gaze point coordinate is a gaze point coordinate in the three-dimensional vector of a corresponding detection time point.

For example, the eyeball tracking apparatus outputs the three-dimensional vectors: (10 ms, 0.1, 0.1), (20 ms, 0.2, 0.2), (30 ms, 0.3, 0.3), (40 ms, 0.4, 0.4), (50 ms, 0.5, 0.5), and so on. The plurality of detection time points are respectively: 10 ms, 30 ms, 50 ms, and so on, and the detected gaze point coordinates obtained in the step S2 are: (0.1, 0.1), (0.3, 0.3), (0.5, 0.5), and so on.

Alternatively, after the eyeball tracking apparatus obtains a plurality of three-dimensional vectors, a detection curve with respect to the detected gaze point coordinate and the current time point may be generated, and a plurality of detection time points and respective corresponding detected gaze point coordinates may be selected from the detection curve.

In step S3, an actual gaze point coordinate corresponding to the at least one detection time point is determined according to the preset mapping relationship between gaze point coordinates and time.

In step S4, a delay amount of the eyeball tracking apparatus is determined according to a coordinate difference between the actual gaze point coordinate and the detected gaze point coordinate at the at least one detection time point.

In a specific embodiment of the present disclosure, the step S4 may include the step S4a including determining the delay amount of the eyeball tracking apparatus, according to the coordinate difference between the actual gaze point coordinate and the detected gaze point coordinate at the detection time point and the rotation angular speed of the mechanical eye.

The embodiments of the present disclosure do not limit the specific process of the step S4a. For example, the largest coordinate difference may be selected from coordinate differences between the actual gaze point coordinate and the detected gaze point coordinate at the detection time points, and the delay amount of the eyeball tracking apparatus may be determined according to the largest coordinate difference and the rotation angular speed of the mechanical eye. For another example, a variance (or a mean square error) of a plurality of coordinate differences corresponding to a plurality of detection time points is determined, and the delay amount of the eyeball tracking apparatus is determined according to the variance (or the mean square error) and the rotation angular speed of the mechanical eye.

In a specific embodiment of the present disclosure, the step S4a specifically includes the following steps S41 and S42.

In step S41, the delay amount corresponding to each of the detection time points is determined, according to the coordinate difference between the actual gaze point coordinate and the detected gaze point coordinate at the at least one detection time point and the rotation angular speed of the mechanical eye.

For example, the euclidean distance between the detected gaze point and the actual gaze point is taken as the coordinate difference between the detected gaze point coordinate and the actual gaze point coordinate. For example, in a case of an actual gazing point coordinate (x1, y1) and a detected gazing point coordinate (x2, y2), the coordinate difference between the detected gazing point coordinate and the actual gazing point coordinate is $\sqrt{|(x1-x2)^2+(y1-y2)^2|}$.

In step S42, an average value of a plurality of delay amounts corresponding to the plurality of detection time points is determined as the delay amount of the eyeball tracking apparatus.

For example, the delay amount of the eyeball tracking apparatus is calculated using the following formula (1):

$$d = \frac{1}{n}\sum_{i=1}^{n} (|p_i - \overline{p_i}| * f(v))$$

where n is the number of the detection time points, $p_i$ is the detected gaze point coordinate of the $i^{th}$ detection time point, $\overline{p_i}$ is the actual gaze point coordinate at the $i^{th}$ detection time point, $|p_i - \overline{p_i}|$ is the coordinate difference between the detected gaze point coordinate and the actual gaze point coordinate at the $i^{th}$ detection time point, v is the rotation angular speed of the mechanical eye, and f (v) is the function between the movement speed of the gaze point of the mechanical eye on the display module and v. f (v) may be determined experimentally.

Figure 5:
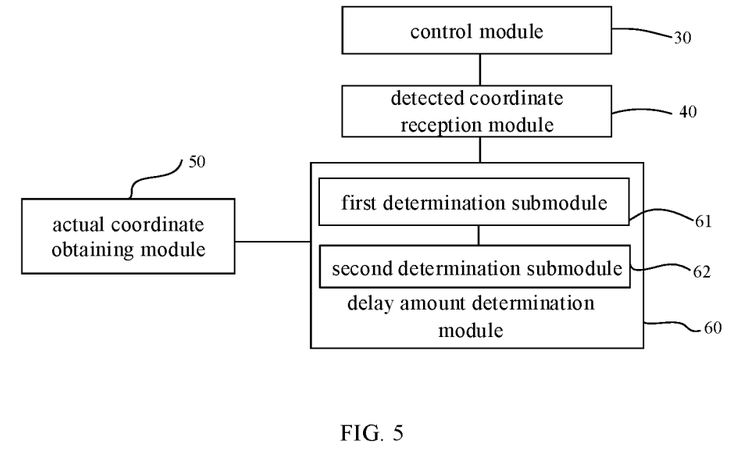
FIG. 5 is a block diagram of a structure of an apparatus for detecting a delay amount of an eyeball tracking apparatus in some embodiments of the present disclosure.

An apparatus for detecting a delay amount of an eyeball tracking apparatus is further provided in some embodiments of the present disclosure, and FIG. 5 is a block diagram illustrating a structure of an apparatus for detecting a delay amount of an eyeball tracking apparatus in some embodiments of the present disclosure. As shown in FIG. 5, the apparatus for measuring the delay amount of the eyeball tracking apparatus may include a detected coordinate reception module 40, an actual coordinate obtaining module 50, and a delay amount determination module 60. The apparatus for measuring the delay amount of the eyeball tracking apparatus may further include a control module 30.

The control module 30 is configured to preset the mapping relationship between gaze point coordinates of the mechanical eye and time; and to control the rotation of the mechanical eye according to the preset mapping relationship between gaze point coordinates and time, so that the detected coordinate reception module may receive the detected gaze point coordinate of the mechanical eye at the at least one detection time point.

The detected coordinate reception module 40 is configured to receive the detected gaze point coordinate of the mechanical eye at the at least one detection time point. The detected gaze point coordinate is a gaze point coordinate of the mechanical eye obtained by the eyeball tracking apparatus.

The actual coordinate obtaining module 50 is configured to determine the actual gaze point coordinate corresponding to the at least one detection time point according to the preset mapping relationship between gaze point coordinates and time.

The delay amount determination module 60 is configured to determine the delay amount of the eyeball tracking apparatus according to the coordinate difference between the actual gaze point coordinate and the detected gaze point coordinate corresponding to the at least one detection time point.

In some embodiments, the at least one detection time point may include a plurality of detection time points. The delay amount determination module 60 is specifically configured to determine the delay amount of the eyeball tracking apparatus according to the coordinate differences between the actual gaze point coordinate and the detected gaze point coordinate at the at least one detection time point and the rotation angular speed of the mechanical eye.

For example, the delay amount determination module 60 may specifically include: a first determination submodule 61 and a second determination submodule 62. The first determination submodule 61 is configured to calculate the coordinate difference between the actual gaze point coordinate and the detected gaze point coordinate at the at least one detection time point. The second determination submodule 62 is configured to determine the delay amount of the eyeball tracking apparatus according to the coordinate difference and the rotation angular speed of the mechanical eye.

In some embodiments, in a case where the at least one detection time point includes a plurality of detection time points, the second determination submodule 62 is further configured to determine, according to the coordinate difference and the rotation angular speed of the mechanical eye, the delay amount at each of the plurality of detection time points, and to calculate the average value of a plurality of delay amounts corresponding to the plurality of detection time points. The average value is regarded as the delay amount of the eyeball tracking apparatus.

Figure 6:
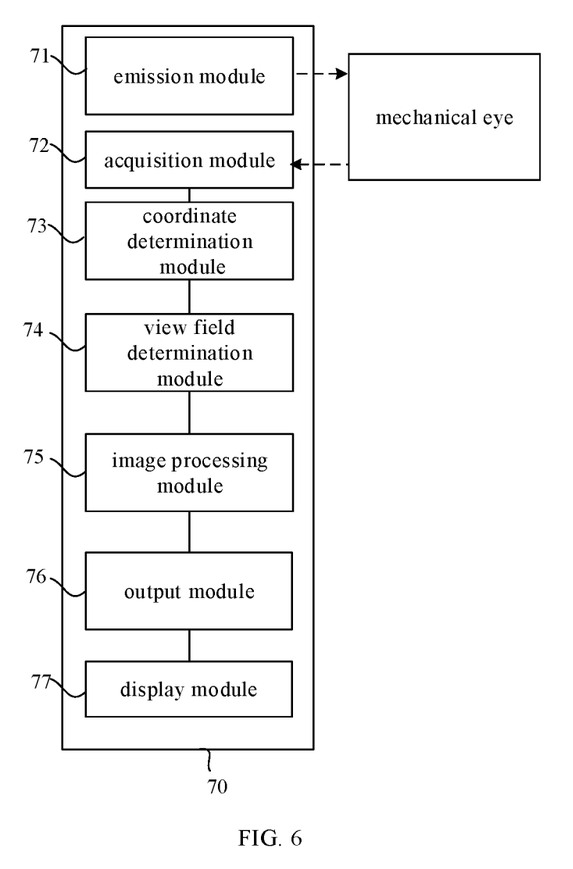
FIG. 6 is a block diagram of a structure of an eyeball tracking apparatus in some embodiments of the present disclosure.

FIG. 6 is a block diagram of a structure of an eyeball tracking apparatus in some embodiments of the present disclosure. As shown in FIG. 6, the eyeball tracking apparatus 70 includes: an emission module 71, an acquisition module 72, a coordinate determination module 73, a view field determination module 74, an image processing module 75, an output module 76 and a display module 77.

The emission module 71 is configured to emit infrared light to the mechanical eye. The acquisition module 72 is configured to acquire an infrared image of the mechanical eye. The coordinate determination module 73 is configured to determine the detected gaze point coordinate of the mechanical eye according to the infrared image of the mechanical eye. The visual field determination module 74 is configured to determine a visual field area, with a center located at the detected gaze point coordinate, of the mechanical eye on the screen of the display module 77, according to the obtained detected gaze point coordinate of the mechanical eye. The image processing module 75 is configured to perform image processing (for example, high resolution processing) on a portion of the image to be displayed corresponding to the visual field area, to obtain a processed image of the visual field area (for example, a high resolution image of the visual field area), and to splice the portion of the image to be displayed corresponding to the other areas except the visual field area and the processed image of the visual field area, so as to obtain an image to be output. The output module 76 is configured to output an image to be output to the display module 77 for displaying.

The detected gaze point coordinate received by the detected coordinate reception module 40 are determined by the coordinate determination module 73. The coordinate determination module 73 may transmit the detected gaze point coordinate to the detected coordinate reception module of the apparatus for measuring the delay amount of the eyeball tracking apparatus.

In a specific example, the emission module 71, the acquisition module 72 and the display module 77 are integrated on a same head-mounted housing. A plurality of signal lines, such as a power line connected to a power supply, a transmission line for transmitting backlight information, a transmission line for transmitting image information, and a transmission line for transmitting tracking data (e.g., of the detected gaze point coordinate), are connected to the head-mount housing.

In some embodiments, the preset mapping relationship between gaze point coordinates and time is a linear function.

The eyeball tracking apparatus includes a head-mounted display device, such as a head-mounted VR (virtual reality) display device. The head-mounted display device is worn on a head model with a mechanical eye. The head-mounted display device is used in combination with a rendering technology, and thus the system power consumption and data transmission bandwidth can be reduced, and the screen refresh rate can be enhanced.

An eyeball tracking system is further provided in some embodiments of the present disclosure, and the eyeball tracking system includes the above eyeball tracking apparatus and the apparatus for measuring the delay amount of the eyeball tracking apparatus in the above embodiments. The eyeball tracking apparatus is configured to determine the detected gaze point coordinate of the mechanical eye or of the human eye on the screen of the display module.

Figure 7:
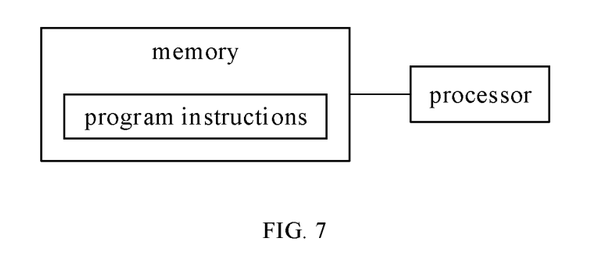
FIG. 7 is a block diagram of a structure of an eyeball tracking apparatus in some embodiments of the present disclosure.

An apparatus for measuring a delay amount of an eyeball tracking apparatus is further provided in the present disclosure. As shown in FIG. 7, the apparatus for measuring the delay amount of the eyeball tracking apparatus includes a processor and a memory. Program instructions are stored on the memory, and are executed by the processor to perform the above method for measuring the delay amount of the eyeball tracking apparatus.

It should be noted that the memory in the embodiments of the present disclosure may include a volatile memory, such as a random-access memory (RAM); or a non-volatile memory, such as a read-only memory (ROM), flash memory, Hard Disk Drive (HDD), or a solid-state drive (SSD); and the memory may also include a combination of above memories.

Figure 8:
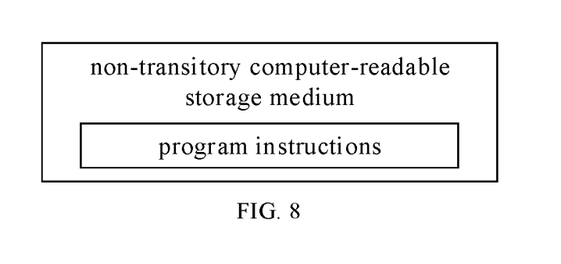
FIG. 8 is a schematic diagram illustrating a non-transitory computer-readable storage medium in some embodiments of the present disclosure.

Based on the same inventive concept, a non-transitory computer-readable storage medium is further provided in the present disclosure. As shown in FIG. 8, program instructions are stored on the non-transitory computer-readable storage medium, and cause a computer to perform the method described in any implementation in the above embodiments when executed on the computer.

Based on the same inventive concept, a computer program product having instructions thereon is further provided, and cause a computer to perform the method described in any implementation in the above embodiments when executed on the computer.

The method and the apparatus for measuring the delay amount of the eyeball tracking apparatus can control the movement of the mechanical eye, determine the delay amount of the eyeball tracking apparatus according to the coordinate difference between the actual gaze point coordinate and the detected gaze point coordinate of the mechanical eye at the detection time point, thereby providing data basis for optimizing the eyeball tracking apparatus.

As will be appreciated by those skilled in the art, embodiments of the present disclosure may be provided as a method, a system, or a computer program product. Accordingly, the present disclosure may take the form of an entirely hardware embodiment, an entirely software embodiment or an embodiment combining software and hardware aspects. Furthermore, the present disclosure may take the form of a computer program product which is embodied on one or more computer-usable storage channels (including, but not limited to, disk storage, optical storage, and the like) having computer-usable program code embodied therein.

The present disclosure is described with reference to flowcharts and/or block diagrams of methods, apparatus (systems), and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine instruction, such that the instructions, which execute via the processor of the computer or other programmable data processing apparatus, create a means for implementing the functions specified in a flow or flows in the flowchart and/or a block or blocks in the block diagram.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in a flow or flows in the flowchart and/or a block or blocks in the block diagram.

These computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions specified in a flow or flows in the flowchart and/or a block or blocks in the block diagram.

It will be understood that the above embodiments are merely exemplary embodiments employed to illustrate the principles of the present disclosure, and the present disclosure is not limited thereto. It will be apparent to those skilled in the art that various changes and modifications may be made without departing from the scope of the disclosure as defined in the following claims, and such changes and modifications are to be considered within the scope of the disclosure.

What is claimed is:

1. A method for detecting a delay amount of an eyeball tracking apparatus, comprising:
   receiving a detected gaze point coordinate of a mechanical eye of at least one detection time point, the detected gaze point coordinate being a gaze point coordinate of the mechanical eye obtained by the eyeball tracking apparatus;
   determining an actual gaze point coordinate of the mechanical eye at the at least one detection time point; and
   determining the delay amount of the eyeball tracking apparatus according to a coordinate difference between the actual gaze point coordinate and the detected gaze point coordinate at the at least one detection time point,
   wherein the determining the delay amount of the eyeball tracking apparatus according to the coordinate difference between the actual gaze point coordinate and the detected gaze point coordinate at the at least one detection time point comprises:
   calculating the coordinate difference between the actual gaze point coordinate and the detected gaze point coordinate at the at least one detection time point; and
   determining the delay amount of the eyeball tracking apparatus according to the coordinate difference and a rotation angular speed of the mechanical eye.

2. The method of claim 1, further comprising:
   presetting a mapping relationship between gaze point coordinates of the mechanical eye and time;
   controlling rotation of the mechanical eye according to the mapping relationship between gaze point coordinates and time; and
   obtaining the detected gaze point coordinate of the mechanical eye at the at least one detection time point during the rotation of the mechanical eye.

3. The method of claim 2, wherein
   the actual gaze point coordinate of the mechanical eye at the at least one detection time point is determined according to the mapping relationship between gaze point coordinates and time.

4. The method of claim 1, wherein
   the at least one detection time point comprises a plurality of detection time points, and the determining the delay amount of the eyeball tracking apparatus according to the coordinate difference and the rotation angular speed of the mechanical eye comprises:
   determining a delay amount corresponding to each of the plurality of detection time points according to the coordinate difference and the rotation angular speed of the mechanical eye; and
   determining the delay amount of the eyeball tracking apparatus according to a plurality of delay amounts corresponding to the plurality of detection time points.

5. The method of claim 4, further comprising:
   calculating an average value of the plurality of delay amounts corresponding to the plurality of detection time points, the average value being taken as the delay amount of the eyeball tracking apparatus.

6. The method of claim 5, wherein
the delay amount of the eyeball tracking apparatus is calculated by:

$$d = \frac{1}{n}\sum_{i=1}^{n}(|p_i - \overline{p_i}| * f(v))$$

wherein n is the number of the plurality of detection time points, $p_i$ is the detected gaze point coordinate of an $i^{th}$ detection time point, $\overline{p_i}$ is the actual gaze point coordinate of the $i^{th}$ detection time point, $|p_i-\overline{p_i}|$ is the coordinate difference between the detected gaze point coordinate and the actual gaze point coordinate at the $i^{th}$ detection time point, v is the rotation angular speed of the mechanical eye, and f (v) is a function between a movement speed of the gaze point of the mechanical eye and v.

7. The method of claim 1, wherein the obtaining the detected gaze point coordinate of the mechanical eye comprises:
emitting, by the eyeball tracking apparatus, infrared light to the mechanical eye;
acquiring, by the eyeball tracking apparatus, an infrared image of the mechanical eye; and
determining, by the eyeball tracking apparatus, the detected gaze point coordinate of the mechanical eye according to the infrared image of the mechanical eye.

8. An apparatus for detecting a delay amount of an eyeball tracking apparatus, comprising a processor and a memory having program instructions stored thereon, wherein the processor executes the program instructions to perform the method of claim 1.

9. A non-transitory computer-readable storage medium, having program instructions stored thereon, wherein when executed on a computer, the program instructions causes the computer to perform the method of claim 1.

10. An apparatus for detecting a delay amount of an eyeball tracking apparatus, comprising:
a detected coordinate reception module configured to receive a detected gaze point coordinate of a mechanical eye of at least one detection time point, the detected gaze point coordinate being a gaze point coordinate of the mechanical eye obtained by the eyeball tracking apparatus;
an actual coordinate obtaining module configured to determine an actual gaze point coordinate of the mechanical eye at the at least one detection time point; and
a delay amount determination module configured to determine the delay amount of the eyeball tracking apparatus according to a coordinate difference of the actual gaze point coordinate and the detected gaze point coordinate at the at least one detection time point,
wherein the delay amount determination module comprises:
a first determination submodule configured to calculate the coordinate difference between the actual gaze point coordinate and the detected gaze point coordinate at the at least one detection time point; and
a second determination submodule configured to determine the delay amount of the eyeball tracking apparatus according to the coordinate difference and a rotation angular speed of the mechanical eye.

11. The apparatus of claim 10, further comprising:
a control module configured to preset a mapping relationship between gaze point coordinates of the mechanical eye and time; and to control rotation of the mechanical eye according to the mapping relationship between gaze point coordinates of the mechanical eye and time, so that the detected coordinate reception module receives the detected gaze point coordinate of the mechanical eye at the at least one detection time point during the rotation of the mechanical eye.

12. The apparatus of claim 11, wherein the actual coordinate obtaining module is configured to determine the actual gaze point coordinate of the mechanical eye at the at least one detection time point according to the mapping relationship between gaze point coordinates of the mechanical eye and time.

13. The apparatus of claim 10, wherein the at least one detection time point comprises a plurality of detection time points, and the second determination submodule is further configured to:
determine a delay amount corresponding to each of the plurality of detection time points according to the coordinate difference and the rotation angular speed of the mechanical eye; and
determine the delay amount of the eyeball tracking apparatus according to a plurality of delay amounts corresponding to the plurality of detection time points.

14. The apparatus of claim 13, wherein the second determination submodule is further configured to calculate an average value of the plurality of delay amounts corresponding to the plurality of detection time points, and to take the average value as the delay amount of the eyeball tracking apparatus.

15. An eyeball tracking system, comprising an eyeball tracking apparatus and the apparatus for detecting the delay amount of the eye tracking apparatus of claim 10.

16. The eyeball tracking system of claim 15, wherein the eyeball tracking apparatus is a head-mounted display device worn on a head model with the mechanical eye.

17. The eyeball tracking system of claim 15, wherein the eyeball tracking apparatus comprises:
an emission module configured to emit infrared light to the mechanical eye;
an acquisition module configured to acquire an infrared image of the mechanical eye; and
a coordinate determination module configured to determine the detected gaze point coordinate of the mechanical eye according to the infrared image of the mechanical eye.

18. The eyeball tracking system of claim 17, wherein the eyeball tracking apparatus further comprises:
a visual field determination module configured to determine a visual field area of the mechanical eye, with a center at the detected gaze point coordinate, according to the obtained detected gaze point coordinate of the mechanical eye;
an image processing module configured to perform image processing on a portion of an image to be displayed corresponding to the visual field area to obtain a processed image of the visual field area, and to splice a portion of the image to be displayed corresponding to other areas except the visual field area and the processed image of the visual field area, to obtain an image to be output;

an output module configured to output the image to be output; and a display module configured to receive the image to be output by the output module and to display the image to be output.

* * * * *